United States Patent [19]

Reuter

[11] 3,725,672

[45] Apr. 3, 1973

[54] METHOD AND CIRCUIT ARRANGEMENT FOR DISPLAYING OR RECORDING A SEQUENCE OF BINARY BITS

[75] Inventor: Ernst Gottfried Reuter, D-7753 Allensbach, Germany

[73] Assignee: Licentia Patent-Verwaltungs-GmbH, Frankfurt am Main, Germany

[22] Filed: July 30, 1971

[21] Appl. No.: 167,676

[30] Foreign Application Priority Data

July 30, 1970 Germany .................... P 20 37 959.3

[52] U.S. Cl. ................307/208, 307/221 R, 307/234, 307/236, 307/265, 328/111, 340/174.1 G

[51] Int. Cl. ..........................................H03k 19/08

[58] Field of Search ......307/208, 236, 210, 234, 265; 179/15.55 T; 235/154; 340/174.1 G, 347 DD; 328/108, 111

[56] References Cited

UNITED STATES PATENTS 3,377,583 4/1968 Sims, Jr. .......................340/174.1 G

*Primary Examiner*—Stanley D. Miller, Jr.

*Attorney*—George H. Spencer et al.

[57] ABSTRACT

A method and circuit for producing a representation of a sequence of binary bits, or a binary word, in the form of a series of changes in the state, or value of a signal, by causing the interval between two successive state changes to have one length when successive binary bits have the same value and a different length when successive binary bits differ from one another in value.

5 Claims, 2 Drawing Figures

METHOD AND CIRCUIT ARRANGEMENT FOR DISPLAYING OR RECORDING A SEQUENCE OF BINARY BITS

BACKGROUND OF THE INVENTION

It is known to represent, and particularly to magnetically record a sequence of binary bits by alternating between two states where two different values are provided for the spacing between two consecutive changes in state to determine the bit value. Such a method is disclosed, for example, in German Published Pat. Application No. 1,152,277, according to which one bit value is to be displayed by a larger interval and the other bit value by a smaller interval between two consecutive changes in state.

Two different intervals between consecutive changes in state, having a ratio of 1:2, also occur in other known magnetic bit recording methods where, for the recording of each bit, a "bit cell" of uniform length is provided. In this group belongs the type of recording which is called "biphase recording" in which a change of flux in one direction or the other is produced in the center of a bit cell depending on which bit value is to be represented in this bit cell, as well as the frequency modulation recording called "two frequency recording" in which a change of state of one frequency represents the one bit value and a change of state in the other frequency, usually double the first frequency, represents the other bit value.

These two types of recording which permit, as does the first-mentioned type, a clock readout, have in common that they request to have at least two changes in state take place for at least one bit value. In the type of display mentioned above each bit has only one associated change of state which simultaneously indicates the beginning of the next succeeding bit; a longer bit duration between two changes of state is required for each bit having one particular value.

SUMMARY OF THE INVENTION

It is an object of the present invention to provide an increased time or space density in the representation or recording of a sequence of binary bits which are economically readable with automatic timing.

The objects of the present invention are achieved by a method for representing or recording a sequence of binary bits by changes between two states, different values being provided for the spacing between two consecutive changes of state to determine each bit value.

According to the present invention, it is determined whether a bit is followed by a bit of the same value or of a different value and, following the preceding change in state, a one-time change of state is effected in one of these cases at a shorter interval and in the other case at a longer interval.

A further development of the present invention is characterized by the formation of intervals between two changes of state which replace two consecutive longer intervals and which are smaller than the total length of these two intervals.

The objects of the present invention are further achieved by a circuit arrangement for carrying out the method and including a coincidence or anti-coincidence gate, devices for feeding the values of two consecutive bits of a bit sequence in a timed manner to the inputs of this gate, switching means which produce a change signal in time dependence on the input of the bit values, a blocking member for inhibiting the change in state and a logic circuit which makes the blocking member effective or ineffective in dependence on the value of the output signal from the gate.

The circuit arrangement, according to a further feature of the present invention, may be so designed that the output signals of the coincidence or anti-coincidence gate become effective, depending on their value, via either one of two paths, and a switch is provided through which the blocking member can be connected to one path or the other.

DESCRIPTION OF THE PREFERRED EMBODIMENTS

Figure 1:
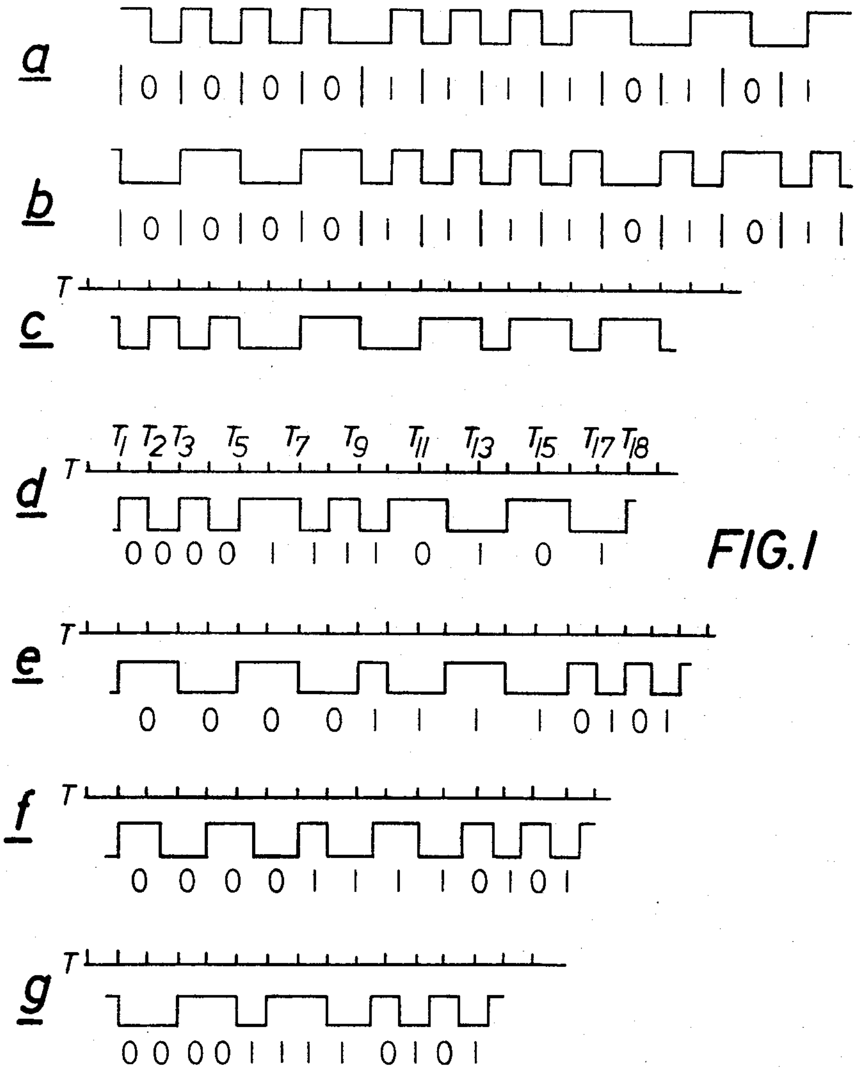
FIG. 1 is a series of diagrams explanatory of one example of the method according to the present invention.

In the diagrams *a–g* of FIG. 1 the display or recording of the bit sequence 0 0 0 0 1 1 1 1 0 1 0 1 is shown according to different methods but always to the same time scale.

Diagram *a* shows the display of the bit sequence according to the biphase recording method. In this method the direction of the change of state taking place in the center of a bit interval determines whether the bit has one value or the other. If bits of the same value follow one another, an additional change of state which does not contain any information must be inserted between the bit value indicating changes of state.

In the two frequency recording method shown in diagram *b*, the bit value "1" is displayed by a change of state at a frequency which is double the frequency employed for the display of the value "0". The time or space requirement for the display of the bit sequence is the same as that of the display according to diagram *a*.

In the display or recording method according to diagram *c*, the principle of which is disclosed in German Published Pat. Application No. 1,152,277, the smaller, or shorter, interval between two consecutive changes of state indicates the bit value "0" and the larger, or longer, interval indicates the value "1". The correspondence could of course also be reversed. The ratio of the smaller interval to the larger interval is 1:2 in the illustrated signal or recording type so that every change of state occurs during a clock pulse of a regular clock pulse sequence T. The time or space requirement for the display of the bit sequence is less than that of diagrams *a* and *b*, or in other words the "storage density" is greater.

Diagrams *d* and *e* show display or recording forms obtained according to the present invention. Here, too, either a smaller or a greater interval is provided between any two consecutive changes of state, these intervals having a ratio of 1:2 for the reason discussed with regard to diagram *c*.

In the display or recording technique depicted by diagram *d*, a shorter interval between successive changes of state signals a bit which has the same value as the preceding bit, while a longer interval between successive changes of state indicates the occurrence of a bit having a value different from that of the preceding bit.

In diagram *e*, on the other hand, a longer interval between successive changes of state indicates a bit which has the same value as the preceding bit and a shorter interval between successive state changes indicates a bit which has a value other than the value of the preceding bit.

The significance of, i.e. the bit value associated with, the first evaluated change of state in diagrams *d* and *e* can be identified as a "0" or "1", for example by its spacing from a preceding beginning reference change of state as a "0". According to the cases illustrated, the first bit value is determined to be "0" so that diagrams *d* and *e* represent the same bit sequence as diagrams *a*, *b* and *c*. The time or space required for recording or displaying the sequence is less, however, for the method of diagrams *d* and *e*. A further reduction can be achieved increasing the ratio of the shorter to the longer interval, e.g. to 1:1.5 more. This reduction technique could also be employed in the method illustrated in diagram *c*.

In diagram *f* the bit sequence which is displayed according to the principle of diagram *e* is also shown, but with a ratio of 1:1.5 for the smaller interval to the larger interval between the changes of state.

A further reduction of the time or space requirement can be achieved if two consecutive larger intervals, which together equal three smaller intervals, are compressed into one interval, which latter interval is only twice as great as a small interval.

A representation or recording which has been further compressed in this manner is shown in diagram *g*. The first and second, third and fourth larger intervals and the fifth and sixth larger intervals, of diagram *f*, each larger interval having a duration of 1.5 times the clock pulse period, are combined and compressed in diagram *g* into three respective intervals each of a duration of 2 times the clock pulse period.

The same method of compression is, of course, applicable to the representation or recording like diagram *d* or *e*, by combining two intervals of the length 2 to one interval of the length 3.

As can be clearly seen, the time or space gain in the type of display according to diagram *d* becomes greater the more frequently identical value bits follow one another and in the type of display according to diagram *e* or *f* it becomes greater the more frequently opposite value bits follow one another. Depending on the respective conditions, which may be given by the type of coding, for example, the one or the other type of display may be selected.

Figure 2:
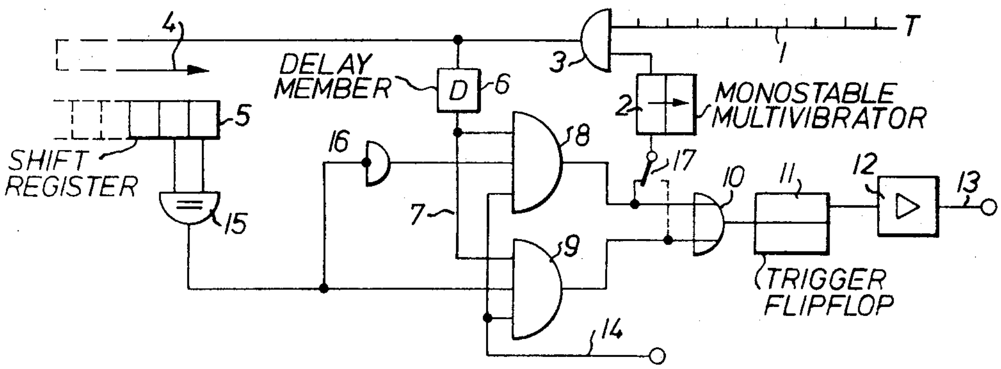
FIG. 2 is a diagram of a circuit arrangement which can carry out the method of the invention.

FIG. 2 shows an embodiment of a circuit arrangement with which the recording of a bit sequence according to the principle of diagram *d* or *e* of FIG. 1 can be accomplished.

A clock pulse line 1 in FIG. 2 receives a train of clock pulses T in a timing pattern shown also in FIG. 1. As long as a monostable multivibrator circuit 2 is in its rest position an AND gate 3 remains enabled so that the clock pulses T reach the shift pulse line 4 of a shift register 5. These pulses also reach a delay member 6 which transfers the pulses after a short slight delay to a line 7 which is connected to one input of each of two AND gates 8 and 9. Each clock pulse on line 7 which passes through one of the AND gates 8 and 9 switches trigger flip-flop 11 to its complement state via an OR gate 10 so that the output of circuit 11 which is connected to a writing line 13 via a writing amplifier 12 passes alternately from one to the other of its output voltage states. A writing command line 14 which is connected to a further input of each of AND gates 8 and 9 either enables, by applying a signal 1, or blocks, by applying a signal 0, these gates.

The bit sequence to be recorded is fed from the left into shift register 5 and is shifted to the right from one register stage to the next by the clock pulses on the shift timing line 4. Each of the last two locations in shift register 5 has its output connected to a respective input of a gate 15 which is either a coincidence gate, as indicated by the symbol on the drawing, or an anti-coincidence gate. A coincidence gate results in the production of a recording of the type shown in diagram *d*, an anti-coincidence gate results in a recording of the type shown in diagram *e* of FIG. 1. The output of gate 15 is connected directly to a third input of the AND gate 9 and to a third input of the AND gate 8 via an inverter 16.

When the first bit to be recorded has reached the third location from the right end of shift register 5, the writing instruction signal "1" is applied to the writing instruction line 14, so that the AND gates 8 and 9 are enabled. The bit sequence under consideration is again to be read from the left and is the sequence shown in FIG. 1. Gate 15 is a coincidence gate, i.e. the procedure is that of diagram *d*. The next occurring clock pulse $T_1$ brings the first bit 0 to be recorded into the second location from the right of the shift register 5.

If that location of the "empty" shift register previously also contained a 0, the pair of values 00 is then present at the gate 15, the output signal "1" of the gate 15 enables the AND gate 9, while the inverted signal 0 from inverter 16 blocks AND gate 8, and the delayed clock pulse T passes to AND gate 9 from line 7. The output from gate 9 switches the flip-flop circuit 11 for the first time and thus produces the first change of state which is shown by the pulse edge at $T_1$ in diagram *d* of FIG. 1 as the starting reference state change.

The next clock pulse $T_2$ brings the first bit 0 to be recorded into the last location of the shift register 5 and the following bit 0 into the penultimate location. This again flips the flip-flop circuit 11 and thus produces the second change of state at $T_2$ in diagram *d* of FIG. 1.

This is repeated for the third and fourth clock pulses $T_3$ and $T_4$.

The fifth clock pulse $T_5$, however, which produces the fifth change of state at $T_5$ in diagram *d* of FIG. 1, does so by passing through AND gate 8 after being delayed because its undelayed version brings the first bit "1" into the penultimate location of shift register 5 so that the pair of values 1, 0 is present at the input of the gate 15 and the resulting output signal 0 from gate 15 blocks AND gate 9, whereas the inverted output signal from gate 15, which is due to inverter 16, enables AND gate 8 to pass the delayed clock pulse.

The fifth clock pulse $T_5$ which is directed through AND gate 8 flips the monostable multivibrator 2, whose input is connected to the output of this AND gate, if required via a switch 17, into its unstable condition so that AND gate 3 is blocked or disabled. The time which passes until the monostable multivibrator 2 flips back to its rest position is set to be greater than the time period between two clock pulses T, but less than twice this time period.

Thus, the sixth clock pulse $T_6$ is not permitted to pass through gate 3, but the seventh $T_7$ is permitted to pass, which produces the change of state, at $T_7$ in diagram *d* of FIG. 1, via AND gate 9 since the undelayed pulse $T_7$ caused the appearance of the input values "1, 1" at gate 15. The same is true for the eighth and ninth clock pulses $T_8$ and $T_9$.

The 10th pulse $T_{10}$, however, which produces the change of state at $T_{10}$ in diagram *d* of FIG. 1, also produces the same result as pulse $T_5$ and is directed through AND gate 8 after delay because that pulse produced, before delay, the pair of input values 0, 1 at the input of gate 15. Therefore, monostable multivibrator 2 is flipped and makes the 11th clock pulse $T_{11}$ ineffective.

The 12th clock pulse $T_{12}$ also passes, after delay in element 6, through AND gate 8 and makes the 13th clock pulse $T_{13}$ ineffective. The 14th clock pulse $T_{14}$, corresponding to input values 0, 1 at gate 15 makes the 15th clock pulse $T_{15}$ ineffective, and the 16th pulse $T_{16}$, corresponding to input values 1, 0 at gate 15, makes the 17th pulse $T_{17}$ ineffective. The 18th clock pulse $T_{18}$ brings the last bit ("1") to be recorded into the last location of the shift register 5 and produces the last change of state shown in diagram *d* of FIG. 1. Immediately after this clock pulse the AND gates 8 and 9 are blocked again by switching the writing instruction signal on line 14 back to "0".

Based on the above description, it can be seen that if gate 15 is an anti-coincidence gate the recording obtained will be that shown in diagram *e* of FIG. 1. The same result can also be obtained if gate 15 remains a coincidence gate and monostable multivibrator 2 is connected to the output of AND gate 9, i.e. to the broken line contact of switch 17, instead of to the output of AND gate 8.

It may be desirable to provide both possibilities for the connection of multivibrator 2. If, for example, switch 17 is an electronic switch and monostable multivibrator 2 is selectively connectable by means of switch 17 to the output of AND gate 8 or the output of AND gate 9, the recording may be selected to be according to either diagram *d* or diagram *e* of FIG. 1, gate 15 being either a coincidence gate or an anti-coincidence gate.

An empty bit interval or cell, following a bit sequence, or block, is represented by "0" values in the respective register locations in shift register 5 when the shifting clock pulses continue. If the number of empty intervals is *n*, equal to at least 2, the writing instruction "1" on line 14 must be switched on again *n*–1 clock periods after the preceding switch-off. The bit value in the last shift register location which is effected by the first effective clock pulse T is then always "0" and the interval between the first change of state to be evaluated after the starting reference change of state indicates which value the first bit of the bit sequence has.

It will be understood that the above description of the present invention is susceptible to various modifications, changes and adaptations, and the same are intended to be comprehended within the meaning and range of equivalents of the appended claims.

I claim:

1. In a method for representing a sequence of binary bits by varying an output signal between two states, the lengths of the intervals between successive state changes being indicative of the bit values, the improvement comprising the steps of:
   - comparing the values of each succeeding pair of bits of the sequence; and
   - causing the interval between each corresponding state change and its preceding state change to have one magnitude when the bits compared have the same value and to have a different magnitude when the bits compared have opposite values.

2. A method as defined in claim 1 wherein the ratio of the two interval magnitudes is 1:2.

3. A method as defined in claim 1 comprising the further step of replacing two consecutive larger magnitude intervals by an interval whose magnitude is smaller than the total magnitude of the two intervals.

4. A circuit arrangement for representing a sequence of binary bits by a signal which undergoes a series of changes in state with the interval between successive state changes having one magnitude when a corresponding pair of bits have the same value and a different magnitude when the corresponding pair of bits have opposite values, said circuit comprising: gate means having two inputs and arranged to produce an output having a first value when the signals at its two inputs are identical and a second value when the signals at its two inputs are non-identical; means for delivering, in a timed sequence, successive pairs of the binary bits to said gate means inputs; switching means for producing the bit sequence-representing and for changing the state thereof in time dependence on the delivery of each pair of bits; blocking means for temporarily inhibiting the creation of a state change; and logic means connected to said blocking means for rendering it effective for a predetermined period of time only when the output from said gate means has one of its values.

5. An arrangement as defined in claim 4 wherein said logic means are composed of two paths one of which transmits a signal only when the output from said gate means has said first value and the other of which transmits a signal only when the output from said gate means has said second value, and further comprising switching means for selectively connecting the input of said blocking means exclusively to either one of said paths.

* * * * *